United States Patent

Sanada et al.

[11] Patent Number: 5,206,079
[45] Date of Patent: Apr. 27, 1993

[54] TAKING-UP LINERS FOR UNVULCANIZED RUBBER MEMBERS

[75] Inventors: Koichi Sanada; Kenichi Haraga; Koushi Nonaka, all of Kodaira, Japan

[73] Assignee: Bridgestone Corporation, Tokyo, Japan

[21] Appl. No.: 356,169

[22] Filed: May 24, 1989

[30] Foreign Application Priority Data

May 26, 1988 [JP] Japan .................. 63-127134

[51] Int. Cl.$^5$ ................ B32B 7/00
[52] U.S. Cl. .................. 428/252; 428/231; 428/246; 428/253; 428/284; 428/285; 428/316.6; 428/447; 428/457
[58] Field of Search ............. 428/230, 253, 254, 246, 428/296, 252, 285, 447, 316.6, 256, 266, 457

[56] References Cited

U.S. PATENT DOCUMENTS

| | | | |
|---|---|---|---|
| 2,656,292 | 10/1953 | Hooever | 154/79 |
| 4,069,359 | 1/1978 | DeMarse et al. | 428/36 |
| 4,247,348 | 1/1981 | Lischer | 156/79 |
| 4,248,926 | 2/1981 | Tajima et al. | 428/253 |
| 4,353,955 | 10/1982 | Cook | 428/316.6 |
| 4,421,807 | 12/1983 | Clausing et al. | 428/343 |
| 4,761,324 | 8/1988 | Rautenberg et al. | 428/231 |

FOREIGN PATENT DOCUMENTS

| | | |
|---|---|---|
| 2233180 | 10/1975 | France . |
| 53-153064 | 12/1978 | Japan . |
| 61-111261 | 5/1986 | Japan . |
| 62-295879 | 12/1987 | Japan . |
| 63-139858 | 6/1988 | Japan . |
| 351643 | 7/1931 | United Kingdom . |
| 2077657 | 12/1981 | United Kingdom . |

*Primary Examiner*—James J. Bell
*Attorney, Agent, or Firm*—Sughrue, Mion, Zinn, Macpeak & Seas

[57] ABSTRACT

A taking-up liner for taking-up an unvulcanized rubber member in a laminated fashion is disclosed, which comprises a strip-like base cloth having stretchability, and at least one elastomer layer bonded to at least one opposite surfaces of said base cloth. The elastomer layer has stretchability, elasticity, and a smooth surface. Alternatively, the taking-up liner may be constituted by a laminate consisting of a strip-like soft foamed member, and at least one elastomer layer bonded to at least one surface of the foamed member. the surface of the laminate is made smooth.

7 Claims, 6 Drawing Sheets

TAKING-UP LINERS FOR UNVULCANIZED RUBBER MEMBERS

BACKGROUND OF THE INVENTION (1) Field of the Invention

The present invention relates to taking-up liners to be used to take up unvulcanized rubber members for tires, for instance, inner liners and sheets of coated cords.

(2) Related Art Statement

Unvulcanized rubber members are sometimes temporarily stored between a step for feeding the unvulcanized rubber members and a step for using such unvulcanized rubber members. In such cases, the unvulcanized rubber members are generally temporarily stored in a rolled fashion in the state that the unvulcanized rubber member is taken up by using a taking-up liner.

In order to take up relatively thin, flat unvulcanized ruber members, fabrics made of organic fibers of, for instance, nylon, polyester, vinylon or polypropylene have first been used as liners. However, such liners form uneven portions on the surfaces of the rubber members due to their yarn meshes during the taking-up of the liners, so that tackiness of the rubber members lowers. That is, when tackiness varies at a taking-up place, working efficiency lowers at an actual use site, and problems occur in tire products in which air enters a joined portion of a tire product due to insufficient bonding forces, and a joint portion at an inner liner cracks. Further, this necessitates the application of a cement rubber, which causes a wasteful consumption of materials. In view of the above, it is a common practice that disposable sheets made of, for instance, polyethylene, polypropylene, and polyvinyl chloride, or repeatedly usable sheets in which a sheet-like elastomer having no elasticity is bonded to a base cloth having no stretchability.

On the other hand, when an unvulcanized rubber member having different rubber thicknesses in a widthwise direction, such as a rubber sheet 20 having a ridge portion as shown in FIG. 17 or a coated cord cut sheet 23 having a squeezed rubber 22 as shown in FIG. 18, is to be taken up, it is a common practice to employ taking-up members in which non-stretchable padding cloths are bonded to opposed side surfaces of a thin soft foamed member. However, such a taking-up member develops creases on the surface thereof, which form crease traces on the unvulcanized rubber member. Furthermore, since the soft foamed member is thin, the member does not uniformly contact with the ridge-provided or curved unvulcanized member when the latter is taken up. That is, since the member is locally squeezed due to locally concentrated contact, the thickness of the rubber changes. Thus, the shrinkage factor changes in the widthwise direction during storage. Consequently, when the unvulcanized rubber member is unrolled for use, it is curved (shortened) as shown in FIG. 17, which leads to poor final products.

Under the circumstances, the present inventors applied for a patent with respect to a technique for improving the above taking-up members which can contact ridge-provided unvulcanized rubber members and prevent the thickness of rubber from changing due to squeezing of the rubber members on locally concentrated contacting (Japanese Patent application Laid-open No. 61-282,000).

However, the above-mentioned liners, currently used for the relatively thin, flat unvulcanized rubber members have the following problems.

When a film of such as nylon, polyester, polyvinyl chloride, or polypropylene is used for taking-up liners, tackiness of the rubber members is improved. However, they have practically many problems in that they are uneconomical being a disposal type, the film is weakened or cut during unrolling for shaping due to low strength of the film to deteriorate peelability between the rubber and the liner and greatly damage workability.

The taking-up liner in which a non-stretchable elastomer is bonded to one or both of opposite surfaces of a base fabric made of organic fibers having low stretchability to mitigate the problems of the above taking-up liners has itself no stretchability. Thus, if the liner slightly deviates from its way during taking-up for use, the manner that the liner is pulled varies in the liner width direction. Consequently, a slackened portion of the liner is taken up in the form of a crease as it is, so that the creases of the liner bites the surface of the unvulcanized rubber member to produce unacceptable products having poor properties. In order to solve such a problem, a method is conceivable for making the liner more stretchable by lowering its strength. In this method, a certain effect can be expected in an initial use stage. However, as the liner continues to be used, stress of the liner is relaxed to cause flatting, which makes use impossible. Therefore, this method is actually not a satisfactory solution. Further, when such a liner is used for taking-up a rubber member having a non-uniform thickness in a widthwise direction, such as a ridge-provided rubber sheet or a coated cord cut sheet having squeezed rubber, the take-up diameter of the rubber member varies in the widthwise direction. That is, the take-up diameter of the thicker portion of the rubber member in which the rubber is thick is greater so that the liner tends to be stretched, while the thinner portion of the rubber member is slackened. Consequently, the rubber member is stretched in the width direction and becomes unbalanced to form creases on the liner. Further, since the thinner portion of the rubber member is not closely adhered with the liner, there is a problem in that tackiness of the rubber member lowers due to the occurrence of blooming.

Next, the taking-up liner conventionally used for taking-up unvulcanized rubber members having a non-uniform thickness in the widthwise direction has the following problems.

In the case of the conventional taking-up liners, since the rubber member is squeezed by its self-weight during temporary storage after the taking-up of the rubber member, plain woven or knitted yarn meshes of the taking-up member bite the surface of the rubber member to form uneven portions thereon. Consequently, tackiness of the rubber member greatly lower. Further, since an intensity of the uneven portions formed due to the yarn meshes varies depending upon take up locations (inner, intermediate and core portions) of the taken-up members, tackiness varies within the rubber member. For this reason, since the tackiness of the rubber member is low, holding forces at a joined portion are weak, when such an unvulcanized rubber member is bonded to other members during a tire-building process. Therefore, workability in the formation of the tire is conspicuously deteriorated. Further, such liners have problems in that air enters the joined portion, that unacceptable products are formed due to poor setting accuracy of the members, and that since the holding forces between the liner and an end portion of a top tread member are weak in the case of a dual tuber (DT) side members, an outer surface precured cement is bitten at the bonded interface to develop DT cracks. Up to now, as countermeasures for solving the problems due to reduction in tackiness of the rubber member, a rubber cement is applied to the unvulcanized rubber member before taking-up, or a film of such as nylon is used as a taking-up sheet. However, such countermeasures measure all involve difficult problems to be solved. Hence, it is an actual situation that no satisfactory taking-up liners exist.

SUMMARY OF THE INVENTION

It is an object of the present invention to solve the problems encountered by the conventional taking-up liners, and to provide excellent taking-up liners which do not lower tackiness of unvulcanized rubber members.

Having made strenuous studies to solve the above-mentioned problems, the inventors have found that the above problems can be solved by constructing the taking-up member in the following manner, in the case where relatively thin, flat unvulcanized rubber members and unvulcanized rubber members having a nonuniform thickness in the widthwise direction are to be taken up.

That is, a first aspect of the present invention relates to a taking-up liner adapted for taking-up an unvulcanized rubber member in a laminated fashion, in which a smooth elastomer layer is bonded to one or both of opposite surfaces of a long strip-like base cloth having stretchability and the elastomer layer has stretchability and elasticity.

A second aspect of the present invention relates to a taking-up liner adapted for taking-up an unvulcanized rubber member in a laminated fashion, in which an elastomer layer is bonded to one or both of opposite surfaces of a long strip-like soft foamed body, the elastomer has stretchability, and at least one of the opposite surfaces of the laminate is smooth.

These and other objects, features and advantages of the invention will be appreciated upon reading of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein.

DETAILED DESCRIPTION OF THE INVENTION

Figure 1:
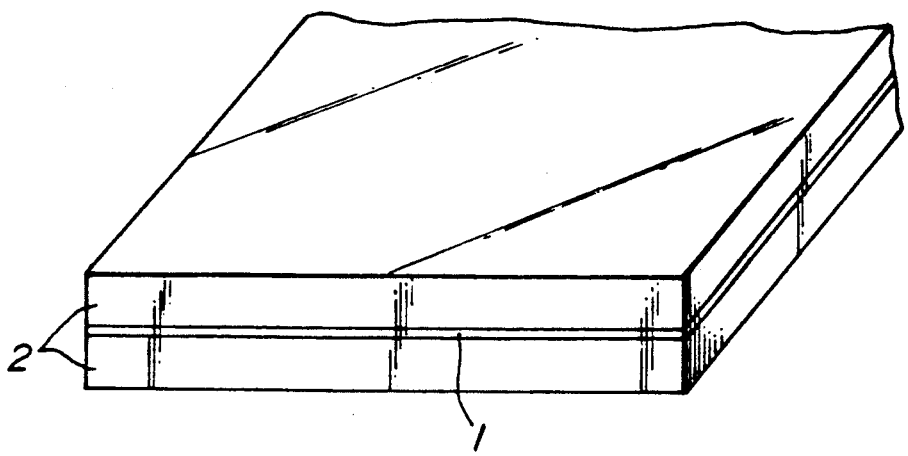
FIG. 1 is a partially perspective view of an embodiment of the taking-up liner according to the present invention.

Now, the taking up liner according to the first aspect of the present invention, which is suitable for taking-up a flat unvulcanized rubber member, will concretely be explained. FIG. 1 shows an embodiment of such a taking-up liner.

A base cloth 1 used in this embodiment is made of a fabric, a knitted fabric, a stretchable fabric, a knitted structure such as tricot, etc. made of extensible organic fibers such as urethane fibers. The base cloth 1 serves to reinforce the liner. Even when stretched some degree in the widthwise direction of the liner varies due to meandering and difference in thickness of the rubber member during taking-up, creases are prevented from being formed on the liner owing to the stretchability of the base cloth. Further, even when the thickness of the rubber member varies as in the case of a coated cord cut sheet attached with a squeezed rubber, the liner uniformly contacts the rubber member so that tackiness of the rubber member can be improved.

In order to attain such an effect, it is preferable that stretchability of the base cloth is not less than 5%.

Next, an elastomer layer 2, which is bonded to one or both surfaces of the base cloth 1, has a smooth surface so that no uneven portions may be formed on the surface of the unvulcanized rubber member, when the rubber is taken up while contacting it. As a result, since the rubber surface is closely adhered with the elastomer layer, the occurrence of blooming of the rubber member is prevented, and a reduction in tackiness of the rubber member can be prevented. Furthermore, since a material having elasticity and stretchability is used as the elastomer layer 2, even if the stretched degree of the liner varies in the width direction, the elastomer layer follows the varying stretched degree together with the base cloth 1. Thereby, formation of creases on the liner can be prevented. In addition, even when the thickness of the rubber member varies, the liner uniformly contacts it. In either case, the elastomer layer has an important effect for improving tackiness of the rubber member.

In order to improve tackiness of opposite surfaces of the unvulcanized rubber member to be taken up, elastomers 2 are provided on the opposite surfaces of the base cloth 1. On the other hand, in order to improve tackiness at only one surface of the rubber member, the elastomer layer 2 has only to be applied to only one surface of the base cloth 1.

As materials usable for the elastomers in the present invention mention may be made of silicon rubber, nitrile rubber (NBR), butyl rubber (IIR), chloroprene rubber (CR), styrene-butadiene copolymer (SBR), natural rubber (NR), isoprene rubber (IR), ethylene-propylene rubber (EPM), fluororubber, butadiene rubber (BR), ethylene-propylene-diene terpolymer rubber (EPDM), acrylic rubber (ACM), chlorosulfonated polyethylene (CSM), polysulfide rubber, and urethane rubber. Silicon rubber is preferred in that it has excellent peelability with respect to the unvulcanized rubber member. Since silicon rubber is expensive, it is possible to use a double layer structure in which only an outermost layer is replaced by silicon rubber.

The thickness of the elastomer layer is sufficient to be about 1 mm.

As the taking-up liners constituted by the above-mentioned base cloths and elastomer layers, which are suited for the present invention, the following examples may be recited.

(1) Taking-up liner in which stretchable silicon rubber sheets as elastic members are bonded to opposite surfaces of a stretchable tricot cloth made of polyester as a base cloth by using an adhesive.

As silicon rubber, either a thermosetting type or a spontaneously setting type may be used. From the standpoint of workability, silicon rubber having a smaller coefficient of thermal expansion ($\mu$) is preferred.

(2) Taking-up liner in which stretchable silicon rubber sheets are bonded to opposite surfaces of an urethane fiber fabric having stretchability as a base cloth by using an adhesive.

(3) Taking-up liner in which urethane rubber sheets are bonded to opposite surfaces of an urethane fiber fabric or a polyester tricot cloth having stretchability as a base cloth by using an adhesive.

(4) Taking-up liner in which fluororubber sheets are bonded to opposite surfaces of an urethane fiber fabric or a polyester tricot cloth having stretchability as a base cloth by using an adhesive.

(5) Taking-up liner in which nitrile rubber sheets are bonded to opposite surfaces of an urethane fiber fabric or a tricot cloth of polyester having stretchability as a base cloth by using an adhesive.

(6) Taking-up liner in which nitrile rubber sheets are bonded to opposite surfaces of an urethane fiber fabric or a polyester tricot cloth having stretchability as a base cloth by using an adhesive, and further silicon rubber sheets are bonded onto the nitrile rubber sheets.

(7) Taking-up liner in which urethane rubber sheets are bonded to opposite surfaces of an urethane fiber fabric or a polyester tricot cloth having stretchability a base cloth, and silicon rubber sheets are bonded onto the urethane rubber sheets.

(8) Taking up liner in which nitrile rubber sheets are bonded to opposite surfaces of an urethane fiber fabric or a polyester tricot cloth having stretchability as a base cloth by using an adhesive, and further fluororubber sheets are bonded thereto.

(9) Taking-up liner in which urethane rubber sheets are bonded to opposite surfaces of an urethane fiber fabric or a polyester tricot cloth having stretchability as a base cloth, and further fluororubber sheets are bonded onto the urethane rubber sheets.

(10) Taking-up liner in which silicon rubber sheets having excellent bondability are bonded to opposite surfaces of an urethane fiber fabric or a polyester tricot cloth having stretchability as a base cloth, and further silicon rubber sheets having a small coefficient of thermal expansion are bonded onto the silicon rubber sheets.

In the taking-up liners given above in (1) through (10), the elastomer layer may be provided on only one surface of the base cloth only.

Next, the taking-up liners according to the second aspect of the present invention, which are suitable for taking-up unvulcanized rubber members having a non-uniform thickness in the widthwise direction, will be completely explained.

In such taking-up liners, a soft foamed member is provided in such a thickness that when a rubber member having a non-uniform thickness in the widthwise direction of the rubber member, such as a ridge-provided unvulcanized rubber member, is taken up by the liner, the outer diameter of the rolled rubber member may not differ in the widthwise direction, while the ridge portion of the rubber members, which cause differences in thickness in the widthwise direction of the rubber member, are completely enclosed in the foamed member. The thickness of the taking-up liner depends upon the rubber member to be taken up, but the thickness is generally in a range from 4 to 12 mm. The thickness is preferably not less than that of the rubber member to be taken up, and that of the most frequently used liners is about 5 mm.

The taking-up liners according to the second aspect of the present invention may be classified into the following three types.

Type 1

Soft foamed members having a given thickness are bonded to entire opposite surfaces of a high rigidity reinforcing cloth having no stretchability. The following two types are obtained by treating the thus obtained laminate below.

(1-1) Taking-up liner obtained by bonding filmy elastomers e,crc/1/ having stretchability to opposite outer surfaces of the soft foamed members, or by bonding, to the opposite outer surfaces, filmy elastomers in which stretchable cloth ② is combined with the elastomer ①.

(1-2) Taking-up liner obtained by bonding the filmy elastomer ① or ② to one of the outer surfaces of the soft foamed members, while a stretchable cloth is bonded to the other surface as an elastomer layer.

Type 2

The following two types are obtained by treating the outer surfaces of the soft foamed members below. (2-1) Taking-up liner obtained by bonding the filmy elastomers ① or ② to the opposite surfaces of the soft foamed members.

(2-2) Taking-up liner obtained by bonding the filmy elastomer ① or ② to one of the outer surfaces of the soft foamed members, while stretchable cloth is bonded to the other outer surface as an elastomer layer.

Type 3

The following two types are obtained by treating the outer surfaces of soft foamed members having a given thickness below.

(3-1) Taking-up liner obtained by bonding a stretchable cloth to one of the outer surfaces of the soft foamed member as an elastomer layer, while a non-stretchable, high rigidity sheet or metallic sheet ③ or a composite sheet in which a non-stretchable, high rigidity cloth ④ is combined with the above elastomer ① is bonded to the other outer surface.

(3-2) Taking-up liner obtained by bonding the filmy elastomer ① or ② to one of the outer surfaces of the foamed members, while the sheet ③ or ④ is bonded to the other surface.

In the above, the surfaces of the elastomers ① and ② as well as those of the sheets ③ and ④ are all smooth. As the elastomers and the sheets, specific examples will concretely be explained below.

①: Filmy elastomer having stretchability

The filmy elastomer may be the same rubber material as the rubber material of the elastomer layer used in the taking-up liner according to the first aspect of the present invention previously mentioned. Particularly, NBR, ACM, CSM, fluororubber and polysulfide rubber are preferred from the standpoint of peelability for the unvulcanized rubber member, excellent oil resistance and chemical resistance against compounded chemicals, oil, etc. separating from the rubber member.

From the standpoint of preventing occurrence of creases of the taking-up liner, the above rubber materials having stretchability and high elasticity are preferred. However, such a material as having stretchability only can well accomplish the object of the present invention. Therefore, plastic materials such as polypropylene, polyester, 6-nylon, 6,6-nylon, polyethylene, polyvinyl chloride, etc. may be used.

Further, the sheet-like elastomer is not only a single material selected from the above rubber materials or the plastic materials, but also the elastomer may be a composite material thereof. The composite material is advantageous from the standpoint of improvement of bondability and cost-down.

②: Stretchable filmy elastomer in which the stretchable cloth is combined with the above elastomer ①

As the stretchable cloth, a fabric or a knit weave using urethane fibers may be used as in the case of the cloth used as a base cloth of the taking-up liner according to the first aspect of the present invention. Such a fabric may consist of warps of urethane fibers and wefts of other organic fibers. Alternatively, the cloth may be a knit weave of fibers made of nylon, polyester, polypropylene, vinylon, cotton, rayon, polyethylene, acrylic resin or polyvinyl chloride. For instance, such a knit weave may be tricot or knit.

Organic fibers may be monofilaments, multifilaments, or spun yarns.

The filmy elastomer is a product obtained by combining the above stretchable cloth with the elastomer material ① and smoothing the surface. More particularly, the surface of the stretchable cloth may directly be coated with the elastomer material, or an urethane layer is formed on the surface of the cloth to improve the bondability or to prevent impregnation.

③: Sheet having no stretchability and high rigidity or metallic sheet

In order to obtain high rigidity sheet having no stretchability, a rubber-plastic composite material mentioned in the above ① may be used. In order to further increase rigidity, it is preferable that the thickness of the material is increased and that a plastic material inherently having high rigidity is used.

As the metallic sheet, a stainless alloy, aluminum, an aluminum alloy, titanium, a titanium alloy, copper, or a copper alloy may be used.

④: Sheet in which a non-stretchable, high rigidity cloth is combined with the elastomer ①

The non-stretchable, high rigidity cloth can be obtained by using warps and wefts mentioned below.

As warps (extending in a longitudinal direction of the liner), metallic wires, or fibers of nylon, polyester, polypropylene, vinylon, polyethylene, acrylic resin, or polyvinyl chloride may be used. As a yarn type monofilament yarns having high flexural strength are preferred. Alternatively, use may be made of multifilament yarns or spun yarns in which the denier and the end count are increased.

As the warps (extending in the widthwise direction of the liner), use may be made of metallic wires, or fibers of nylon, polyester, polypropylene, vinylon, cotton, rayon, polyethylene, acrylic resin, or polyvinyl chloride. As the yarn type, any one of monofilament yarns, multifilament yarns, and spun yarns may be used.

The rigidity of the non-stretchable, high rigid cloth consisting of the above warps and wefts may be increased by dipping it into a resin. The surface of this base cloth may be smoothed by combining the cloth with the elastomer material ①, thereby obtaining an intended sheet.

Figure 2:
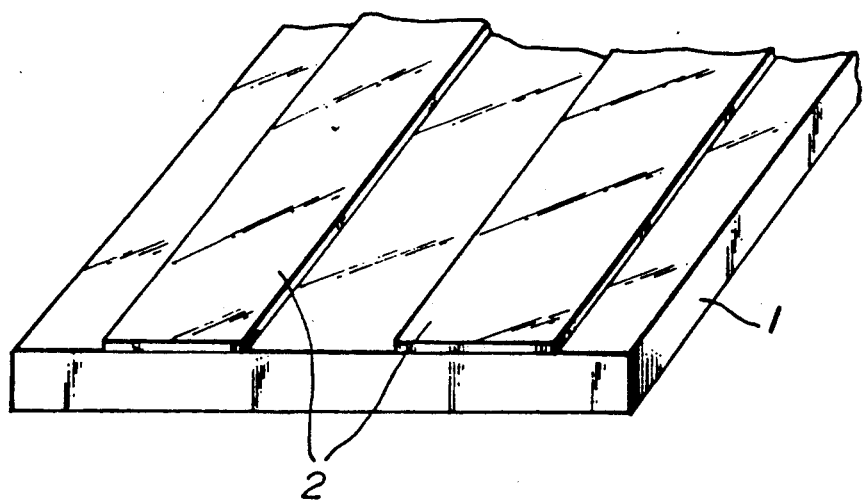
FIG. 2 is a partially perspective view of another embodiment of the taking-up liner according to the present invention.

As shown in FIG. 2, each of the elastomers ① and ② and the sheets ③ and ④ may be bonded to the base cloth only at a portion where the liner contacts the unvulcanized rubber member.

Next, preferred embodiments of the taking-up lines of the above types (1) through (3) will be explained with reference to the attached drawings.

Figure 3:
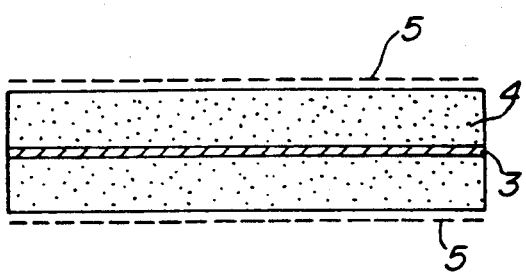
FIG. 3 is a sectional view of a type (1-1) of the taking-up liner according to the present invention.

A taking-up liner shown in FIG. 3 is of the type (1-1). In FIG. 3, a cloth 3 having high rigidity and no stretchability functions as a reinforcing cloth. The cloth may be made of the same material as that of the above cloth ④ having no stretchability and high rigidity. Rigidity of the cloth may be increased by dipping it into a resin. A filmy elastomer 5 having stretchability is bonded to the outer surface of each of soft foamed members 4 with an adhesive or by heat fusion bonding. In order to enhance bondability, an urethane layer may be provided between the soft foamed member and the filmy elastomer 5. A filmy elastomer in which the stretchable cloth ② is combined with the elastomer ① may be used as the filmy elastomer 5.

Figure 4:
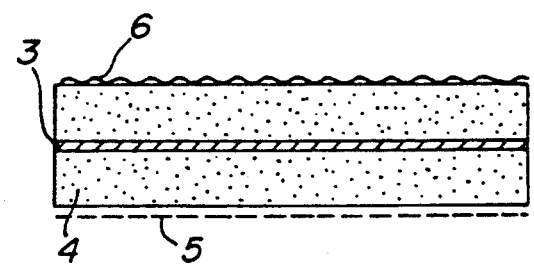
FIG. 4 is a sectional view of a type (1-2) of the taking-up liner according to the present invention.

A taking-up liner shown in FIG. 4 is of the type (1-2). This taking-up liner is the same as that in FIG. 3 except that the filmy elastomer 5 on one side of the liner is replaced by a stretchable cloth 6 such as tricot.

Figure 5:
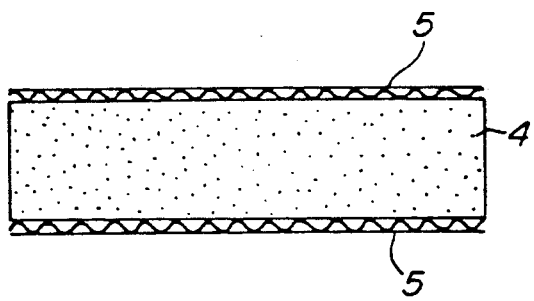
FIG. 5 is a sectional view of a type (2-1) of the taking-up liner according to the present invention.

A taking-up liner shown in FIG. 5 is of the type (2-1). The construction of this taking-up liner is the same as that of the liner in FIG. 3 except that no reinforcing cloth 3 is provided in the center of the soft foamed member 4. In the taking-up liner of FIG. 5, a film elastomer 5 in the above ② is bonded to each of the outer surfaces of the soft foamed member 4.

Figure 6:
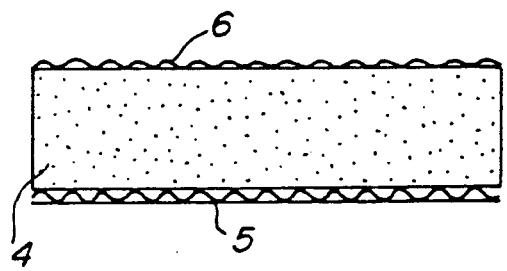
FIG. 6 is a sectional view of a type (2-2) of the taking-up liner according to the present invention.

A taking-up liner shown in FIG. 6 is of the type (2-2). This taking-up liner is the same as that in FIG. 5 except that the filmy elastomer 5 on one of the surfaces of the liner is replaced by a stretchable cloth 6.

Figure 7:
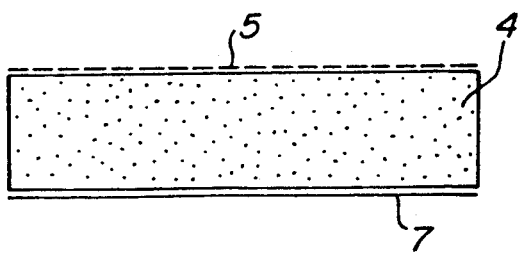
FIG. 7 is a sectional view of a type (3-1) of the taking-up liner according to the present invention.

A taking-up liner shown in FIG. 7 is of the type (3-1). In this taking-up liner, the filmy elastomer ① or ② is bonded to one of the outer surfaces of the soft foamed body 4, and the sheet having no stretchability but high rigidity in the above ③ or ④ is bonded to the other outer surfaces.

Figure 8:
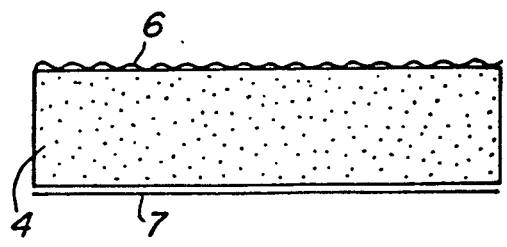
FIG. 8 is a sectional view of a type (3-2) of the taking-up liner according to the present invention.

A taking-up liner shown in FIG. 8 is of the type (3-2). The taking-up liner is the same as that in FIG. 7 except that stretchable cloth 6 is bonded instead of the filmy elastomer 5.

The first taking-up liner according to the present invention has the following functions.

Since reinforcing action and stretchability are given to the base cloth, occurrence of creases is prevented through absorption of strain, even if tensile forces in the widthwise direction of the liner become non-uniform owing to meandering, etc. during taking-up of the unvulcanized rubber. Further, the taking-up liner uniformly contacts the unvulcanized rubber member in the widthwise direction following it, even when the thickness of the rubber member varies.

Since an appropriate rubbery material which can be stretched or shrink following stretching or shrinkage of the base cloth is selectively used for the elastomer layer bonded to one or both of the surfaces of the base cloth, occurrence of creases of the taking-up liner is prevented, and uniform contact with the rubber member is ensured. Further, since the surface of the taking-up liner is smooth, yarn meshes (uneven portions) are present on the liner. Consequently, since the surface of the rubber member is sealed, any education in tackiness is prevented.

The second taking-up liner according to the present invention functions to completely enclose projections due to difference in thickness of the unvulcanized rubber member with the soft foamed member, so that there is no difference in the outer diameter of the rolled rubber member in the widthwise direction, and the rubber member uniformly contacts the liner in the widthwise direction.

As a result, in this taking up liner, since the smooth surface elastomer layer or sheet layer free from yarn meshes (uneven portions) uniformly contacts the unvulcanized rubber member in the widthwise direction and seals the surface thereof, any reduction in tackiness due to occurrence of blooming (separating of compounded chemicals, oil, etc. on the rubber surface) in the vulcanized rubber member is prevented. Further, since yarn meshes of the liner are not formed on the rubber member, reduction in tackiness due to the taking-up is prevented. Moreover, since taking-up pressure is uniformly applied to the unvulcanized rubber member in the widthwise direction, changes in the thickness of the rubber member owing to squeezing of the liner are diminished. Thus, since a contraction factor of the unvulcanized rubber member does not change in the widthwise direction during taking-up and storage, the rubber member is prevented from being bent (shortened phenomenon) during unrolling for use.

In the taking-up liner, the elastomer layer which is bonded to one or both of the outer surfaces of the soft foamed member needs to have given stretchability. This is because when the rubber member is taken up in a given diameter in the taking-up step, although tensile forces and compression forces act on the outer diameter and the inner diameter sides (outer and inner sides) of the liner, respectively, creases need to be prevented form occurring on the inner diameter side owing to strain. In the following, the elongation percentage required will concretely be explained.

Figure 9:
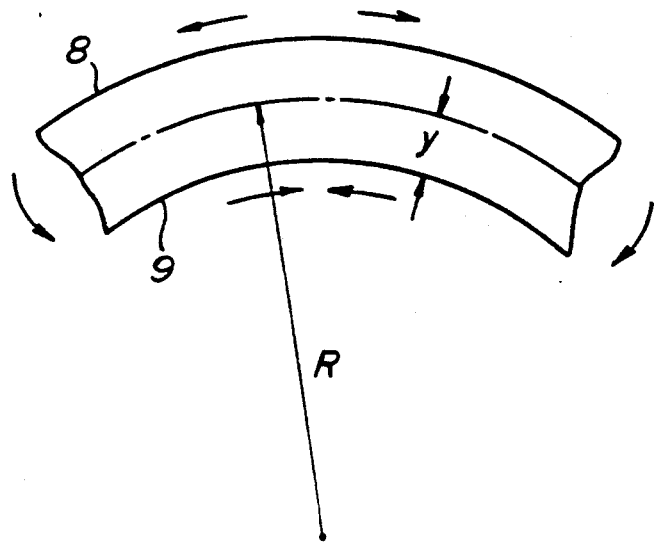
FIG. 9 is a view for illustrating a state in which tensile forces and compression forces act outside and inside of a taking-up liner, respectively, when the liner is rolled.

When the second taking-up liners of the type (1) and (2) are taken up or unrolled, compressing forces and tensile forces act upon the inside and the outside of the taking-up liner as shown in FIG. 9. A strain amount ($\epsilon$) is calculated based on FIG. 9 according to the following equation $$\epsilon = y/R \quad \text{(I)}$$

in which R and y are a bending radius and a distance from the center to the surface of the liner, respectively.

Figure 10:
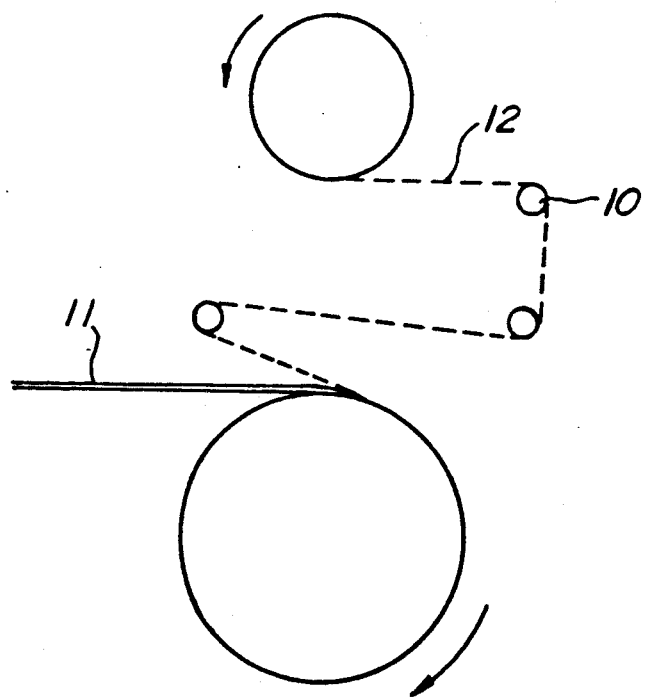
FIG. 10 is a view for illustrating a way in which a taking-up liner and a rubber member are taken up together.

The thickness of the liner is changed depending upon the rubber member to be taken up, and is preferably not less than that of the latter. Therefore, the thickness of the liners to be frequency used is set about 5 mm. The liner is generally taken up as shown in FIG. 10. In this figure, guide rolls 10 having a diameter 25 mm$\phi$ at the minimum are used. Thus, when the thickness of the liner is set at 5 mm, the tensile strain ($\epsilon$) acting upon the outer side of the liner is calculated to be 20% according to the equation (I). Therefore, in order to effectively prevent the occurrence of creases on the taking-up liners of the type (1) and (2) in this case, the elongation of the outer layer of the liner is required to be not less than 20%.

Next, as to the taking-up liner of the type (3), since a bending strain acts around the inner side of the liner having higher rigidity as a fulcrum, the tensile strain ($\epsilon$) occurring at the outer side is determined by the following equation:

$$\epsilon = 2/R \quad \text{(II)}$$

When the diameter of guide rolls 10 is 2.5 mm$\phi$ at the minimum and the thickness of the liner is 5 mm, the tensile strain occurring on the outer side is calculated to be 40% according to the equation (II). Therefore, the elongation of the outer layer of the taking-up liner of the type (3) is required to be not less than 40%.

From the above, it is necessary that the elongation of the elastomer of the outer member of the taking-up liner is not less than 20% for the types (1) and (2), and not less than 40% for the type (3).

Figure 11:
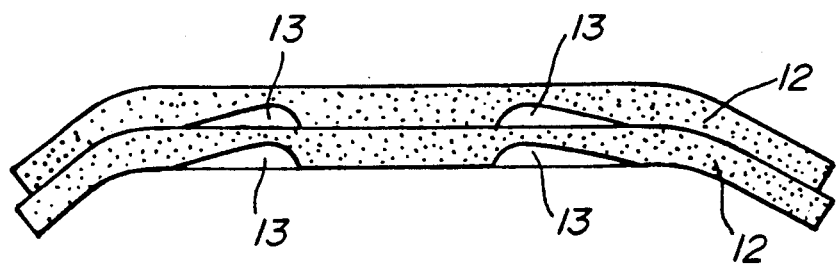
FIG. 11 is a partially sectional view for illustrating a state in which a rubber member is taken up by a taking-up liner according to the present invention.

In the taking-up liner of the type (1) according to the present intention, the reinforcing cloth having high rigidity and no stretchability is arranged in the center to uniformly disperse the bending strain on the inside and the outside and to reinforce the liner. Moreover, as shown in FIG. 11, tension is applied in the widthwise direction of the taking-up liner 12 to prevent hanging of that portion of the taking-up liner 12 which does not contact the rubber member 13 and to prevent creasing.

Next, the present invention will be explained in more detail with reference to Examples and Comparative Examples.

EXAMPLE 1 AND COMPARATIVE EXAMPLES 1 AND 2

(First taking-up liner according to the present invention)

A taking-up liner was prepared by bonding silicon rubber sheets to opposite surfaces of a stretchable tricot cloth made of polyester as a base cloth with an adhesive (Example 1). By using this liner, an inner liner rubber sheet member of a squeezed structure for passenger car radial tires was taken up. After the rolled rubber sheet member was allowed to be left one day, it was unrolled and performances of the liner were evaluated.

Figure 12:
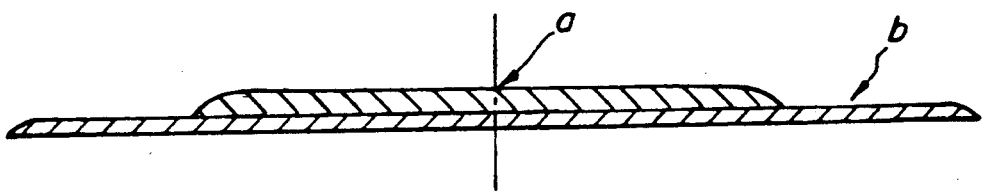
FIG. 12 is a sectional view of a rubber member for showing locations where tackiness of the rubber member is measured.

With respect to three location: a core portion, an intermediate portion and an outer portion of the rolled rubber sheet, evaluations were effected by measuring tackiness of the rubber member at each of the central portion "a" and the end portion "b" as shown in FIG. 12. The occurrence of creases of the taking-up liner was also observed when the liner was rolled.

Results obtained were shown in Table 1.

For comparison purpose, similar evaluations were effected with respect to conventional taking-up liners: a polyester plain weave liner (Comparative Example 1) and a liner in which polyethylene sheets were bonded to opposite surfaces of a polyester member as a base cloth (comparative Example 2). Results thereof are also shown in Table 1.

TABLE 1

|  |  |  | Example 1 | Comparative Example 1 | Comparative Example 2 |
|---|---|---|---|---|---|
| Tackiness after rubber member was allowed to be left for 24 hours (g) | Core portion | a | 830 | 220 | 890 |
|  |  | b | 850 | 570 | 600 |
|  | Intermediate portion | a | 785 | 410 | 830 |
|  |  | b | 820 | 590 | 605 |
|  | Outer portion | a | 790 | 720 | 850 |
|  |  | b | 780 | 600 | 500 |
| Occurrence of creases on liner |  |  | no | no | occurred |

From Table 1, it is seen that the taking-up liner according to the present invention has excellent tackiness when compared with the conventional liners. Further, in the liner according to the present invention, the properties of the rubber sheet member were not damaged by occurrence of creases of the liner due to meandering of the liner. Furthermore, workability is improved as compared with the conventional liners.

EXAMPLES 2 TO 4 AND COMPARATIVE EXAMPLE 3

Figure 13:
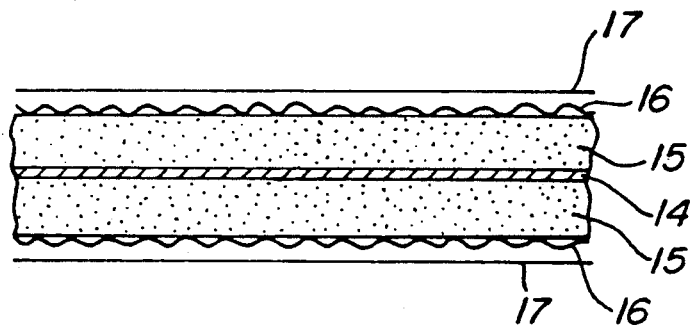
FIG. 13 is a sectional view of a taking-up liner of the type (1) according to the present invention used in Example 2.
Figure 14:
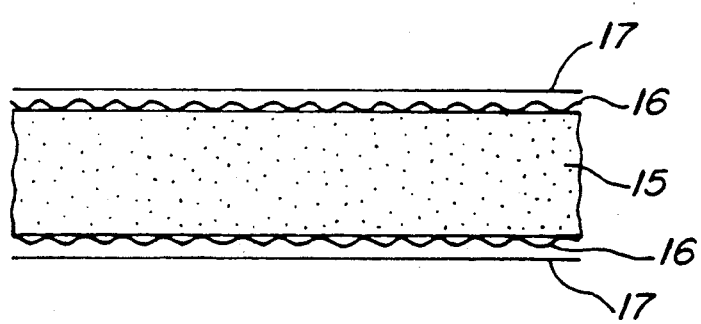
FIG. 14 is a sectional view of a taking-up liner of the type (2) according to the present invention used in Example 3.
Figure 15:
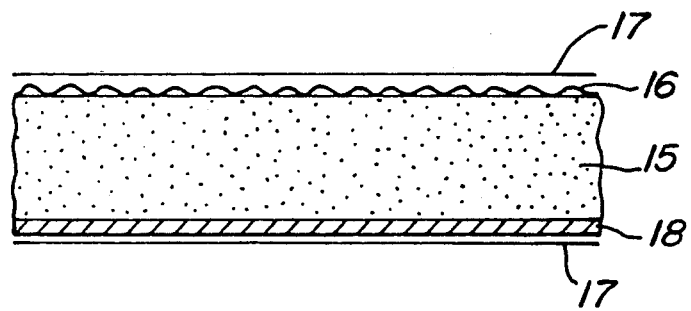
FIG. 15 is a sectional view of a taking-up liner of the type (3) according to the present invention used in Example 4.

As the second type (1), (2) and (3), taking-up liners shown in FIGS. 13, 14 and 15 (Examples 2, 3, and 4, respectively) were prepared.

A reinforcing cloth 14 of the taking-up liner of the type (1) according to the present invention in FIG. 13 is a cloth using polyester monofilaments as weft and warps. The cloth increases rigidity to prevent being creases on taking-up, and reinforces the liner on unrolling. A foamed urethane foam 15 is bounded to each of the opposite surfaces or the reinforcing cloth 14, and a polyester knit 16 coated with silicon rubber 17 is bonded to the outer surface of the foamed urethane foam 15. The polyester knit 16 is like a women stocking cloth, and has stretchability. Thermal setting type silicon is bonded to this cloth by using an adhesive. Since silicon only affords slightly insufficient strength and bondability, the polyester knit 16 functions to compensate them. The foamed urethane foam 15 is bonded to the polyester knit 16 by heat fusion.

The taking-up liner of the type (2) according to the present invention in FIG. 14 is the same as that in FIG. 13 except that no reinforcing cloth 14 is provided.

In the taking-up liner of the type (3) according to the present invention in FIG. 15, a reinforcing sheet 18 is bonded instead of the elastomer layer on one surface of the liner of the type (2). Bending rigidity of the reinforcing sheet 18 is increased by using a cloth made of polyester monofilaments as wefts and warps. Further, the reinforcing sheet 18 is coated with silicon rubber 17. In this taking-up liner, consider that a rubber member is taken up while the reinforcing sheet 18 is located inside. When bending stress acts, elongation forces act on the outer side (outer diameter side) only, because the high rigidity sheet is located radially inside. Thus, no creases are formed.

Figure 16:
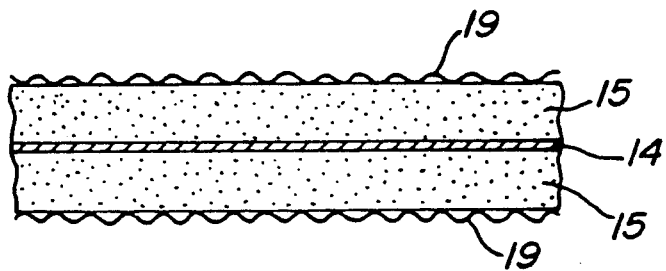
FIG. 16 is a sectional view of a conventional taking-up liner.

For comparison purpose, the taking-up liner shown in FIG. 16 was prepared (Comparative Example 3). This taking-up liner has a reinforcing cloth 14 in the center of an urethane foam 15 as in the case of the taking-up liner of the type (1) according to the present invention. In FIG. 16, a tricot sheet 19 having stretchability is bonded to each of the outer surfaces of the urethane foam members 5.

By using the taking-up liners in Examples 2 to 4 and Comparative Example 2, rigid-provided rubber members for passenger car radial tires were taken up, and unrolled for use after temporary storage. Then, performances of each of the taking-up liners were evaluated.

Figure 17:
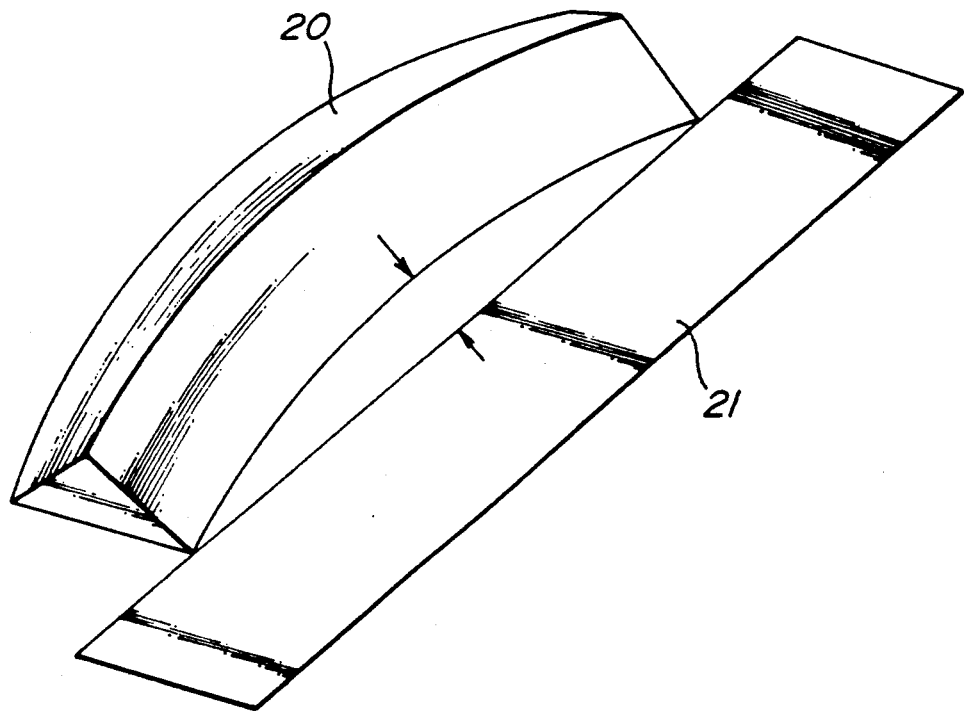
FIG. 17 is a view for illustrating a method for measuring a curved amount of a ridge-provided rubber member.
Figure 18:
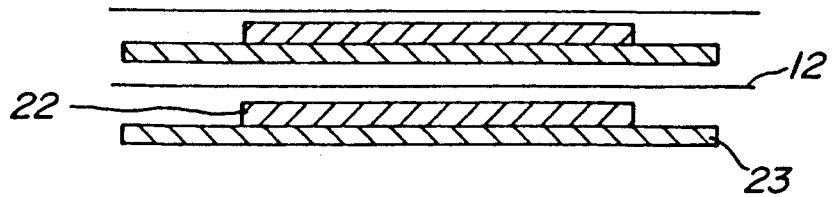
FIG. 18 is a view of a coated cord cut sheet with a squeezed rubber.

With resect to an outer portion, an intermediate portion and a core portion of each of the rolled unvulcanized rubber members, tackiness, crushing of the ridge-portion of the rolled rubber member, a bent amount of the rubber member, and occurrence of creases of the liner were evaluated. The bent amount of the rubber member was determined by unrolling the rolled rubber member after the storage for 24 hours following the taking-up, cutting it in a length of 1 m, placing a cut portion on a flat plate, and measuring a distance c between the central portion of the ridge-provided rubber member and a scale 21 while the scale is butted to the opposite ends of the rubber member 20 as shown in FIG. 17.

Results are shown in Table 2.

TABLE 2

|  |  | Comparative Example 3 | Example 2 | Example 3 | Example 4 |
|---|---|---|---|---|---|
| Type of liner |  | Conventional | Type (1) | Type (2) | Type (3) |
| Tackiness (g) | Core portion | 195 | 820 | 870 | 760 |

TABLE 2-continued

|  | Comparative Example 3 | Example 2 | Example 3 | Example 4 |
| --- | --- | --- | --- | --- |
| Intermediate portion | 350 | 880 | 800 | 850 |
| Outer portion | 425 | 900 | 850 | 740 |
| Depression of ridge portion of rolled rubber member (mm) | not more than 1 | not more than 1 | not more than 1 | not more than 1 |
| Bent amount of rubber member (mm) | not more than 15 | not more than 13 | not more than 13 | not more than 12 |
| Occurrence of creases on liner | occurred | no | no | no |

As in clear from Table 2, the taking-up liners according to the present invention all greatly improve tackiness of the rubber members, and decrease the bent amount of the rubber members as compared with conventional liners. Further, creases are not formed on the taking-up liners of the present invention.

As explained above, the taking-up liner according to the present invention does not develop creases, or damage the properties of the rubber members. In addition, as compared with the conventional liners, the liners according to the present invention greatly improve tackiness of the rubber members unrolled, and substantially solve variations in tackiness in the rolled rubber member. Accordingly, even if no rubber center is applied between tire rubber members, stable bonding can be obtained. As a result, material cost can be reduced by omitting the rubber cement, and variations in a hue of product due to partial oozing of coated rubber cement at side shoulder portions can be diminished. In addition, tackiness of the rubber member is stabilized, so that workability on applications is improved, and that problems of poor products in that air enters joint due to insufficient bonding forces of the members are diminished.

What is claimed is:

1. A taking-up liner for taking-up an unvulcanized rubber member in a laminated fashion, said liner comprising; a laminate consisting of a strip-like soft foamed member, a reinforcing cloth in a central portion of said soft foamed member, said reinforcing cloth having high rigidity and essentially no stretchability, and at least one elastomer layer bonded to at least one surface of said foamed member, at least one surface of said laminate being smooth.

2. The taking-up liner according to claim 1, wherein said elastomer includes a stretchable cloth.

3. The taking-up liner according to claim 1, wherein a stretchable cloth is bonded to the other surface of the laminate.

4. The taking-up liner according to claim 1, wherein said elastomer layer is a stretchable cloth.

5. The taking-up liner according to claim 1, further comprising stretchable cloths bonded to opposite surfaces of said foamed member, said at least one elastomer layer bonded to one of said stretchable cloths and a second elastomer layer bonded to the other of said stretchable cloths.

6. The taking-up liner according to claim 6, wherein said stretchable cloths comprise a polyester knit and said elastomer layers comprise coatings of silicon rubber.

7. The taking-up liner according to claim 1, wherein said reinforcing cloth comprises polyester monofilaments as wefts ad warps.

* * * * *